(12) United States Patent
Pinkerton

(10) Patent No.: US 6,345,518 B1
(45) Date of Patent: Feb. 12, 2002

(54) TAKE OUT MECHANISM WITH PREHEAT CYCLE FOR I.S. MACHINE

(75) Inventor: Steven J. Pinkerton, Avon, CT (US)

(73) Assignee: Emhart Glass S.A., Cham (CH)

(*) Notice: Subject to any disclaimer, the term of this patent is extended or adjusted under 35 U.S.C. 154(b) by 0 days.

(21) Appl. No.: 09/460,583

(22) Filed: Dec. 14, 1999

(51) Int. Cl.⁷ .............................. C03B 9/41; C03B 9/447
(52) U.S. Cl. .............................. 65/159; 65/160; 65/165; 65/260
(58) Field of Search .................. 65/29.11, 159, 65/160, 163, 165, 260

(56) References Cited

U.S. PATENT DOCUMENTS

| | | | | |
|---|---|---|---|---|
| 3,767,374 A | * | 10/1973 | Iacovazzi et al. | 65/165 |
| 4,349,368 A | * | 9/1982 | Hullen et al. | 65/28 |
| 4,351,663 A | * | 9/1982 | Wood | 65/66 |
| 4,431,436 A | * | 2/1984 | Lulejian | 65/159 |
| 4,531,961 A | * | 7/1985 | Hileman et al. | 65/164 |
| 4,614,531 A | * | 9/1986 | Bishop et al. | 65/158 |

* cited by examiner

*Primary Examiner*—Sean Vincent
(74) *Attorney, Agent, or Firm*—Spencer T. Smith

(57) ABSTRACT

A control is disclosed for a section of an I.S. machine which produces vertically standing bottles having a finish portion at the top thereof, with two vertically separated gripable finish portions. The section has a takeout displaceable between advanced and retracted positions, tongs carried by the takeout which can be closed, and an opposed pair of blow molds which can be displaced from a closed position to an open position. A takeout control controls the advancement of the takeout to either a first "in" position for gripping one of the gripable finish portions or a second vertically lower "in" position for gripping the other gripable finish portion and for retracting the takeout from either the first or second "in" position to a selected "out" position. A tongs control controls the closing of the tongs and a blow mold control controls the displacement of the blow mold pair to an open position. The control can operate in a preheat blow mold cycle for first operating the takeout control to advance the takeout to the first "in" position, second operating the tongs control to close the tongs, third operating the blow mold control to displace the pair of blow molds to the open position, and fourth operating the takeout control to retract the takeout to the "out" position.

4 Claims, 3 Drawing Sheets

TAKE OUT MECHANISM WITH PREHEAT CYCLE FOR I.S. MACHINE

The present invention relates to machinery for manufacturing glass containers, such as an individual section machine.

BACKGROUND OF THE INVENTION

An I.S. (individual section) machine has a plurality of identical sections (a section frame in which and on which are mounted a number of section mechanisms) each of which has a blank station which receives one or more gobs of molten glass and forms them in blankmolds into parisons having a threaded opening at the bottom (the finish) and a blow station which receives the parisons and forms them in blowmolds into bottles standing upright with the finish at the top. An invert and neck ring holder mechanism which includes an opposed pair of arms, rotatable about an invert axis, carries the parisons from the blank station to the blow station inverting the parisons from a finish down to a finish up orientation in the process. A bottle a formed at the blow station is removed from the section by a takeout mechanism which has a pair of tongs which will grip the finish of a formed bottle before it is released from the blow mold.

Before an I.S. machine can produce good bottles, the mold equipment must be preheated. This is initially accomplished by loading successive gobs of molten glass into the blankmolds which, until the blankmolds are heated will form defective parisons which must be removed from the blank station by an operator. When the blankmolds are heated and produce good parisons the invert mechanism will deliver the parisons to the blow station but the blow molds will form defective bottles until the blank station becomes properly warmed up. For example, when the parison is not blown into a fully formed bottle, it will drop when the blow mold opens so that the take out cannot grip the finish and carry it out to the conveyor dead plate. An operator must then reach with a pair of tongs and quickly remove the glass before the next parison is transferred to the blow mold. At the same time, the operator must avoid being hit by the neck ring arms and the take out mechanism that continue to operate in the normal manner.

OBJECT OF THE INVENTION

It is accordingly an object of this invention to automatically remove defective bottle from the blow station.

Other objects and advantages of the present invention will become apparent from the following portion of this specification and from the accompanying drawings that illustrate in accordance with the mandate of the patent statutes a presently preferred embodiment incorporating the principles of the invention.

BRIEF DESCRIPTION OF THE DRAWINGS

Referring to the drawings.

BRIEF DESCRIPTION OF THE PREFERRED EMBODIMENT

Figure 1:
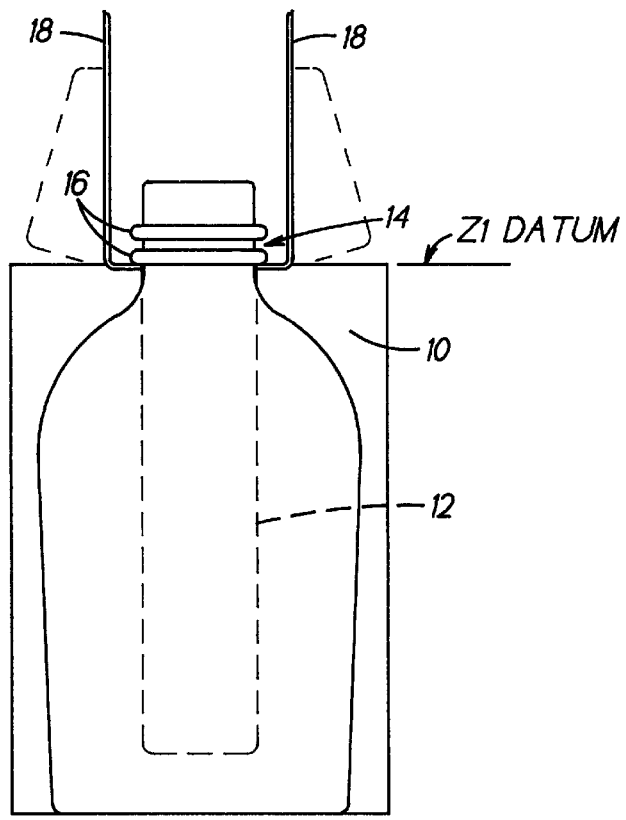
FIG. 1 is a schematic showing looking from one blow mold of a open blow mold pair, through a blown bottle at the other blow mold with the tongs of a takeout mechanism gripping the bottle below the finish.
Figure 4:
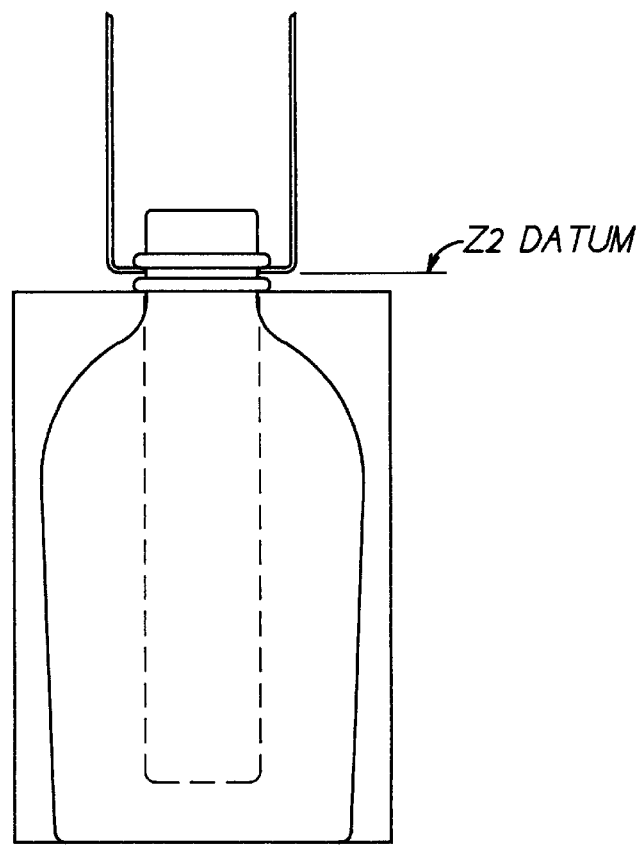
FIG. 4 is a view similar to FIG. 1 with the tongs gripping the finish above the bottom of the finish.

The blow station of a section of an I.S. machine is made up of one or more opposed pairs of blow molds 10 (one shown) which are displaceable between open and closed positions. A parison 12 (shown in dotted lines in FIG. 1) is delivered to each blow mold when the blow mold pair is open and the blow molds are closed around the parison, below the finish 14 to define the mold. In FIG. 1, the finish is schematically shown as a pair of vertically spaced rings 16 which could be separated threads on which the cap is to be screwed onto. To blow the parison into the bottle, a baffle (not shown) is positioned on top of the closed blow molds around the finish and air under pressure is forced through the baffle into the parison to blow it into a bottle. The baffle is than retracted away from the top of the blow mold pair (blow head off). The blow molds are not opened until the formed bottle has been sufficiently cooled to be able to stand and before the blow mold pair is opened, a take out which supports a pair of tongs 18 at its bottom, is located at the ready position (the dotted line position/take out in) so that when the blow mold pair is opened (mold open), the tong pair can be closed to grip the bottle immediately below the finish (tongs closed). The take out, with a bottle gripped by the tongs, will be displaced to a deadplate (take out out) where the bottle will be held above the deadplate and further cooled. Following this further cooling, the tongs will be opened to release the bottle onto a deadplate where it will be engaged by a pusher which will sweep the bottle onto a conveyor.

Figure 2:
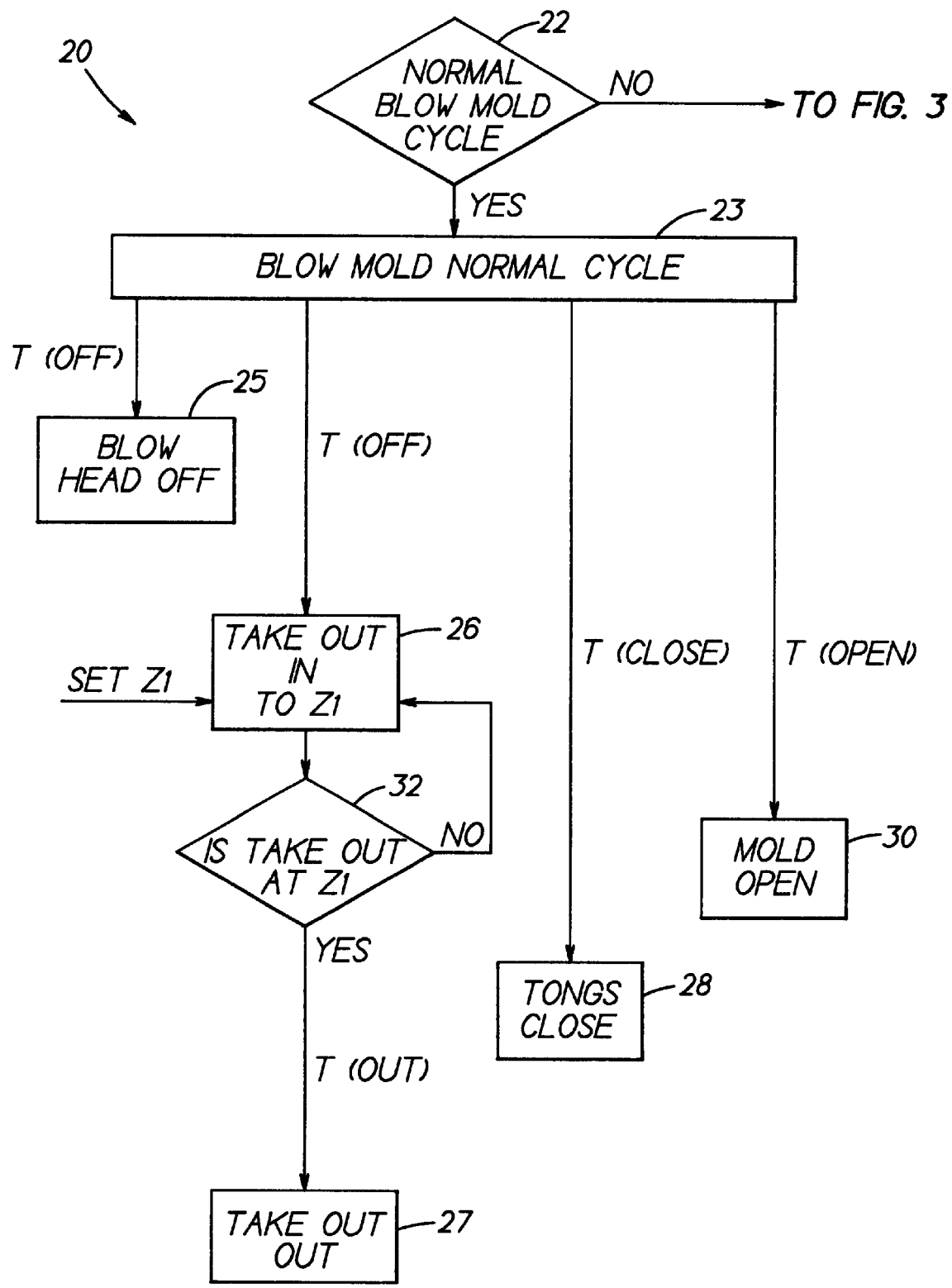
FIG. 2 is a flow chart illustrating a control algorithm for the sequence of events for a normal blow mold cycle.

The control 20 (FIG. 2) has a selector 22 which will determine whether the blow mold normal cycle 23 or the blow mold preheat cycle 24 (FIG. 3) is to operate. The algorithm illustrated in FIG.2 shows the operation of a normal blow mold cycle in an I.S. machine section, from the time the blow head has completed blowing the bottle until the bottle is removed from the blow molds. Blow head off 25, take out in to Z1 (26) and take out out 27, tongs close 28, and mold open 30 are separate timed events (they occur at specific times referenced from the beginning of a section cycle) that are entered into the forming cycle as inputs. The first timed event is blow head off 25 at T(off). Following removal of the blow head, takeout in to Z1 (26) at T(in) will result in the displacement of the takeout, with the tongs open, to the fully down location above the blow molds. Mold open 30, which occurs at T(open) will open the molds. With the molds open, tongs close (28) at T(close) will result in the tongs gripping the bottle below the bottom ring of the finish 14 at the Z1 datum. As can be seen from FIG. 2, the control, following the command to displace the take out in, will verify that the takeout has in fact been located at datum Z1 (Is takeout at Z1 (32). If this is verified, at T(out), which is later than T(close), takeout out 27 will raise the tongs and displace the gripped bottle to a location over the section dead plate (not shown).

Figure 3:
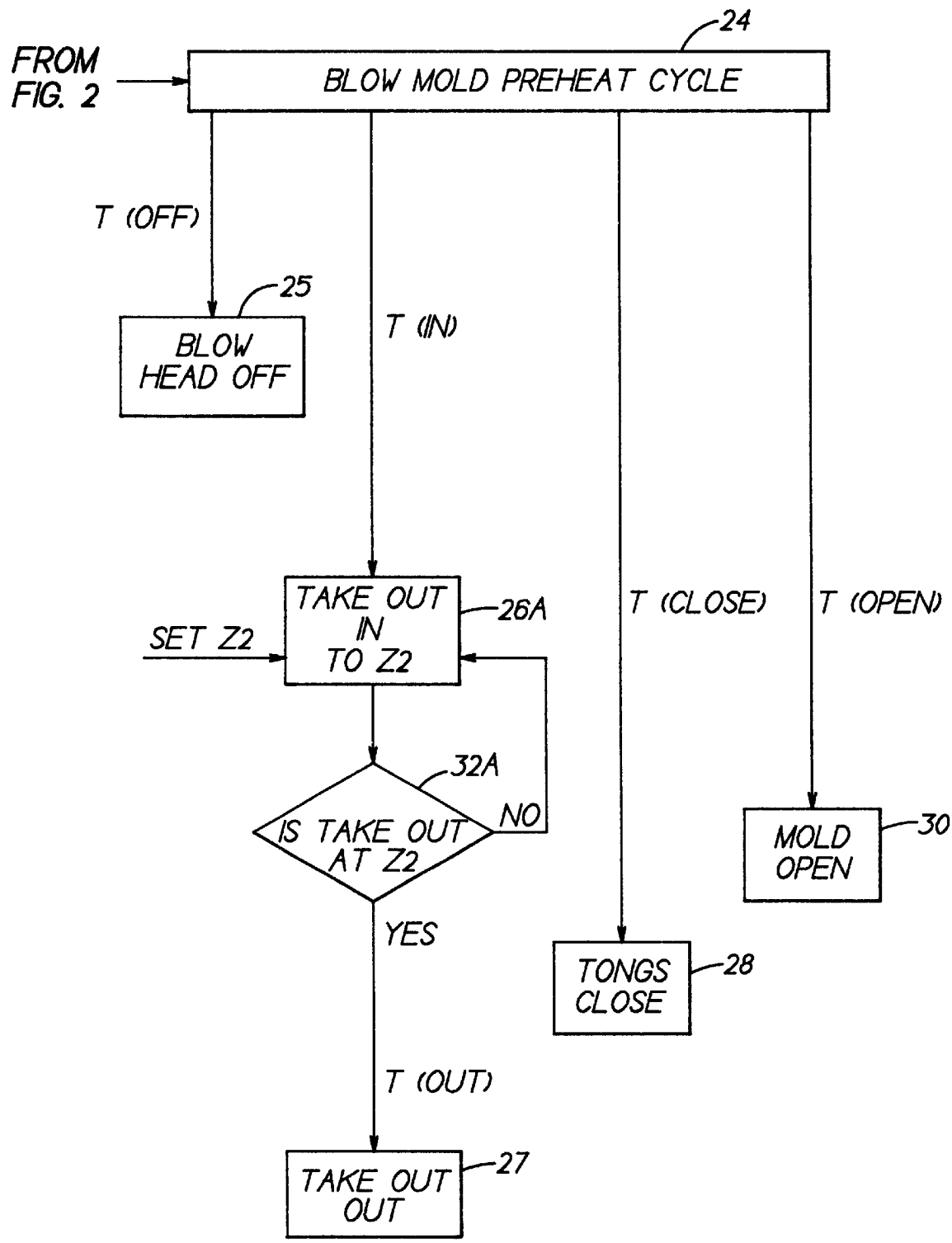
FIG. 3 is a flow chart illustrating the control algorithm for a blow mold preheat cycle.

When the control is set for the blow mold preheat cycle 24, the flow chart will be as illustrated in FIG. 3. The first timed event is blow head off 25 at T(off). Following removal of the blow head, takeout in to Z2 (26A) at T(in) will result in the displacement of the takeout, with the tongs open, to the fully down location above the blow molds. With the molds closed, tongs close (28) at T(close), which is later than T(in), will result in the tongs gripping the bottle below the upper ring of the finish 14 at the Z2 datum. Mold open 30, which occurs at T(open), which is later than T(close), will then open the molds. As can be seen from FIG. 2, the control, following the command to displace the take out in to Z2, will verify that the take out has in fact been located at datum Z2 (Is take out at Z2 (32A)). If this is verified, at T(out), which is later than T(open), takeout out 27 will raise the tongs and displace the gripped bottle to a location over the section dead plate (not shown).

What is claimed is:

1. A control for a section of an I.S. machine which produces vertically standing bottles having a finish portion at the top thereof with two vertically separated gripable finish portions, the section having a takeout displaceable between advanced and retracted positions, tongs carried by the takeout which can be closed, and an opposed pair of blow molds which can be displaced from a closed position to an open position, comprising a takeout control for advancing the takeout to either a first "in" position for gripping one of the gripable finish portions or a second vertically lower "in" position for gripping the other gripable finish portion and for retracting the takeout from either the first or second "in" position to a selected "out" position, a tongs control for closing the tongs carried by the takeout, a blow mold control for displacing the blow mold pair to an open position, a normal blow mold cycle sequencer for first operating said takeout control to advance the takeout to the second lower "in" position, second operating said blow mold control to displace the pair of blow molds to the open position, and third operating said tongs control to close the tongs, and fourth operating said takeout control to retract the takeout to the "out" position and a preheat blow mold cycle sequencer for first operating said takeout control to advance the takeout to the first "in" position, second operating said tongs control to close the tongs, third operating said blow mold control to displace the pair of blow molds to the open position, and fourth operating said takeout control to retract the takeout.

2. A control for a section of an I.S. machine according to claim 1, wherein said normal blow mold cycle sequencer further comprises means for verifying that the takeout has been advanced to the second lower "in" position before operating said takeout control to retract the takeout to the "out" position.

3. A control for a section of an I.S. machine according to claim 1, wherein said preheat blow mold cycle sequencer further comprises means for verifying that the takeout has been advanced to the first "in" position before operating said takeout control to retract the takeout to the "out" position.

4. A control for a section of an I.S. machine according to claim 1, wherein said gripable finish portions are vertically separated threads.

* * * * *